United States Patent [19]

Hathaway et al.

[11] Patent Number: 4,736,013

[45] Date of Patent: Apr. 5, 1988

[54] METHOD FOR THE PREPARATION OF HYDROXY-TERMINATED POLYCARBONATE POLYMERS

[75] Inventors: Susan J. Hathaway, Schenectady; Kathryn L. Longley, Saratoga Springs, both of N.Y.; Robert A. Pyles, Evansville, Ind.

[73] Assignee: General Electric Company, Schenectady, N.Y.

[21] Appl. No.: 40,524

[22] Filed: Apr. 20, 1987

[51] Int. Cl.$^4$ ............................................... C08G 63/62
[52] U.S. Cl. .................................. 528/196; 528/198; 528/199; 528/200
[58] Field of Search ............... 528/196, 198, 199, 200

[56] References Cited

U.S. PATENT DOCUMENTS

| | | | |
|---|---|---|---|
| 3,697,481 | 10/1972 | Bialous et al. | 528/196 |
| 4,233,431 | 11/1980 | Idel et al. | 528/196 |
| 4,273,717 | 6/1981 | Carnahan | 260/345.9 |
| 4,469,860 | 9/1984 | Rosenquist | 528/196 |

*Primary Examiner*—Harold D. Anderson
*Attorney, Agent, or Firm*—Francis T. Coppa; James C. Davis, Jr.; James Magee, Jr.

[57] ABSTRACT

A method for preparing thermoplastic carbonate polymers terminated with hydroxy groups is disclosed, in which a dihydric phenol is reacted with a carbonyl halide in the presence of a monotetrahydropyranyl ether salt. The hydroxy-terminated polymer is then obtained by cleaving the tetrahydropyranyl group with oxalic acid or a hydrogen halide acid.

14 Claims, No Drawings

METHOD FOR THE PREPARATION OF HYDROXY-TERMINATED POLYCARBONATE POLYMERS

The present invention relates in general to methods for making carbonate polymers. More particularly, it relates to an improved method for preparing hydroxy-terminated polycarbonates.

BACKGROUND OF THE INVENTION

Polycarbonate polymers are highly regarded engineering resins because of their excellent physical properties. For example, aromatic polycarbonates formed from dihydric phenols exhibit high tensile and impact strength as well as very good thermal stability. However, the use of polycarbonates in some applications, e.g., automotive, is limited somewhat because of their poor resistance to various organic solvents and other chemicals. Polycarbonates are thus blended with another thermoplastic polymer such as a polyamide in order to form a product which exhibits more chemical resistance than polycarbonate alone. For example, Japanese Kokai No. 116541/50 discloses a blend containing 80-95% by weight polycarbonate and 5-20% by weight of Nylon 12. A particularly promising combination of a polycarbonate polymer and a polyamide is disclosed in a copending and commonly assigned application, Ser. No. 939,391, filed Dec. 8, 1986. In that invention, polymers containing carbonate units in the main chain and also having functionalizing end groups are mixed with polyamides or other suitable polymers to form a thermoplastic blend in which some of the end groups of the functionalized polycarbonate polymer react with the second polymer to form a copolymer. The resulting polymer product has excellent physical properties while also exhibiting excellent chemical resistance.

The particular steps for forming the blended products disclosed in Ser. No. 939,391 include first reacting a hydroxy-terminated carbonate-containing polymer with a functionalizing agent to provide functionalized end groups on the polymer which will in turn react with the second polymer to form the copolymer.

In order to react the functionalizing agent with the thermoplastic polymer, it is generally necessary to first hydroxy-terminate the polymer. Some methods of preparing carbonate polymers terminated with hydroxy groups are known in the art. For example, U.S. Pat. No. 3,153,008, issued to D. Fox, discloses the preparation of such polymers via ester interchange during the melt polymerization of a dihydric phenol with diphenyl carbonate. However, such a melt polymerization technique has several disadvantages. For example, the technique may result in yields of hydroxy-terminated polymer which are too low for some commercial processes. Furthermore, the melt polymerization method results in a product having an excessively wide molecular weight distribution.

It is therefore an object of the present invention to provide a method of making hydroxy-terminated carbonate polymers which overcomes the foregoing disadvantages.

It is a further object of the present invention to interfacially polymerize polycarbonates of any desired molecular weight.

It is yet another object of the present invention to provide interfacially-polymerized polycarbonates having relatively narrow molecular weight ranges.

It is still another object of the invention to provide an improved chain-terminating agent for an interfacial polymerization reaction.

DETAILED DESCRIPTION OF THE INVENTION

A wide variety of thermoplastic polymers having recurring carbonate units in the main chain and terminated with hydroxy groups may be prepared according to the present invention. These polymers may be homopolymers or copolymers, and are hereinafter also referred to as carbonate polymers.

In the first step of this method, a dihydric phenol is reacted with a carbonyl halide in the presence of an alkali metal salt of a monotetrahydropyranyl ether of a dihydric phenol, having the formula

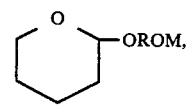

wherein R is a divalent aromatic compound containing from about 6 to about 30 aromatic carbon atoms and M is an alkali metal ion. For the sake of simplicity, the above-described salt will hereinafter generally be referred to as the "monotetrahydropyranyl ether salt". Furthermore, it should be understood that any dihydric phenol may be used to form the carbonate polymer or the monotetrahydropyranyl ether salt.

The monotetrahydropyranyl ether salt is present in an amount sufficient to chain-terminate the polymer at a desired molecular weight, as further described below. Therefore, the salt may hereinafter alternatively be referred to as a "chain-terminator".

After completion of this reaction, the hydroxy-terminated polymer is obtained by removing, i.e., cleaving, the tetrahydropyranyl group with a molar excess of an acid. The details of this process will now be discussed.

A wide variety of dihydric phenols may be used in the present invention, such as those disclosed in U.S. Pat. Nos. 2,999,835; 3,028,365; 3,334,154; 4,190,681; and 3,160,121, all incorporated herein by reference. Dihydric phenols having substituents attached thereto, such as chlorine, bromine, fluorine, nitro groups, and organic groups, may also be used. A preferred dihydric phenol for use herein is 2,2-bis(4-hydroxyphenyl)-propane (bisphenol A).

Carbonyl halides suitable for this method include phosgene, diphosgene (also referred to as trichloromethyl chloroformate), and bromophosgene, phosgene being the preferred carbonyl halide.

Exemplary monotetrahydropyranyl ether salts containing the tetrahydropyranyl group and having the formula set out above are described in J. Carnahan's U.S. Pat. No. 4,273,717, incorporated herein by reference. The divalent organic group R may be any of those described in the Carnahan patent corresponding to the formula

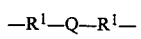

Q being selected from the group consisting of oxygen, sulfur, dialkyl or diaryl silicon, fluorenyl, cyclohexyl, and alkylene groups containing from about 1 to about 5 carbon atoms. $R^1$ is a divalent aromatic hydrocarbon group having about 6 to 20 carbon atoms. $R^1$ may have halogenated groups attached thereto. The various dihydric phenols described in the Carnahan patent discussed above may be used to form the salts.

Illustrative R groups suitable for the present invention include

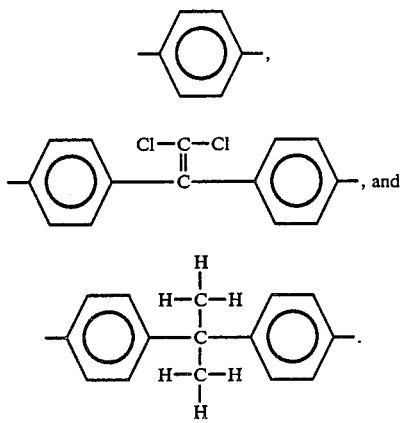

Furthermore, various other substituents may be attached to aromatic or aliphatic portions of R, such as fluorine, bromine, nitro groups, and organic groups.

The alkali metal M of the salt may be sodium, potassium or lithium, with sodium being most preferred because sodium hydroxide is usually employed during polymerization.

A more detailed description of an improved method for making the monotetrahydropyranyl ether salt will be provided below.

The reaction between the dihydric phenol and the carbonyl halide in the presence of the monotetrahydropyranyl ether salt may be carried out by several techniques. For example, the reaction may be carried out as a solution polymerization in a medium such as pyridine, which acts as a solvent for the reactants and the resulting polymer. In such a reaction, the carbonyl halide may be passed into a solution of the dihydric phenol under conditions which cause a viscous solution of the polymer to rapidly form. After that solution is washed with acid and then water, the polymer is isolated by well-known methods, e.g., evaporation or precipitation with a nonsolvent such as methanol.

In preferred embodiments of the present invention, the hydroxy-terminated thermoplastic carbonate polymer is prepared by interfacial polymerization. This technique for preparing polycarbonates is well-known in the art and described, for example, in *Organic Polymer Chemistry*, by K. J. Saunders, Chapman and Hall (1973), page 240.

In brief, interfacial polymerization involves polymerization at the interface of an aqueous phase containing the dihydric phenol or salts thereof and an organic phase containing a solvent for the polymer, such as methylene chloride. The preferred interfacial technique for the present invention involves incorporating the dihydric phenol into an aqueous metal hydroxide solution such as aqueous sodium hydroxide or aqueous potassium hydroxide by wellknown methods, e.g., stirring. This first mixture is then dispersed in a second mixture which includes an organic solvent, the monotetrahydropyranyl ether salt, and a tertiary amine or quaternary ammonium base. Any convenient method of dispersion may be used. The resulting dispersion is a biphasic (i.e., two-phase) composition prior to addition of the carbonyl halide.

Organic solvents suitable for use in the second mixture include chlorobenzene, methylene chloride or chloroform, with methylene chloride being the preferred organic solvent. The tertiary amine or quaternary ammonium base functions as a polymerization catalyst and is usually utilized at levels ranging from about 0.01 mole % to about 5.0 mole %, based on total moles of dihydric phenol and catalyst. Tertiary amines suitable for use herein include triethylamine, pyridine, and N,N-dimethylaniline, although any tertiary amine which is soluble in the reaction mixture and has a basicity sufficient to catalyze the polymerization reaction could be utilized. Examples of quaternary ammonium bases include tetrabutyl ammonium halides and other tetra-alkyl ammonium halides. The preferred polymerization catalyst is triethylamine.

The amount of monotetrahydropyranyl ether salt present in the biphasic reaction mixture is directly related to the desired molecular weight for the polymer product. Thus, higher molecular weight hydroxy-terminated carbonate polymers, e.g., those having a molecular weight (weight average) of about 80,000, may be formed by using about 3.0 mole % of the monotetrahydropyranyl ether salt, based on total moles of the dihydric phenol forming the polymer. Conversely, lower molecular weight polymer products may be formed by using a higher level of the monotetrahydropyranyl ether salt. For example, molecular weights of as low as 20,000 may be obtained by using about 6 mole % of the salt. When the hydroxy-terminated carbonate polymer is to be subsequently reacted with a functionalizing agent such as trimellitic anhydride acid chloride according to the process disclosed in Ser. No. 939,391, monotetrahydropyranyl ether salt levels sufficient to form a polymer having a weight average molecular weight of about 40,000 to about 60,000 are desired. The examples given below further illustrate molecular weight control accomplished by the present invention.

The carbonyl halide may be added to the above-described two-phase reaction mixture by methods well-known in the art. For example, phosgene in gaseous form may be bubbled into the two-phase mixture under agitation.

During addition of the carbonyl halide, the pH of the two-phase mixture should be maintained at between about 8 and 12, and more preferably, between about 10.0 and 11.0. The controlled addition of an aqueous solution of an alkali metal hydroxide compound to the mixture is effective for maintaining the pH within the desired range.

Polymerization proceeds rapidly upon addition of the carbonyl halide. The resulting mixture includes an organic phase containing the organic solvent, the chain-terminated polymer, and free amine; and an aqueous phase containing a metal salt, reaction by-products, e.g., of the carbonyl halide with the amine or ammonium base, and metal hydroxide. The reaction by-products may also include alkali metal ions and halide ions.

Separation of the organic phase from the aqueous phase may be effected by methods well-known in the art, e.g., centrifugation.

The hydroxy-terminated carbonate polymer is obtained by removing the tetrahydropyranyl group with an effective amount of an acid. An "effective amount" is that amount sufficient to cleave the tetrahydropyranyl groups from the polymer chain. The acid must be soluble in the solvents used in the polymerization reaction; must have sufficient strength to cleave the tetrahydropyranyl groups; and must not undergo ring formation in the organic phase. Acids which may be suitable include hydrogen halide acids such as hydrochloric acids (HCl), hydrobromic acid or hydriodic acid. Hydrochloric acid is the most preferred acid for this method because of the rapid and effective cleavage that results from its use.

When used, hydrochloric acid must be in the form of an aqueous solution containing at least about 15% by weight hydrogen chloride, since lower concentrations do not sufficiently cleave the tetrahydropyranyl groups from the polymer chain. In more preferred embodiments, the aqueous solution should contain at least about 30% by weight hydrogen chloride. Furthermore, in the most preferred embodiments, the concentration is at least about 37% in water, since this level ensures very rapid cleavage.

If hydrobromic acid or hydriodic acid is used as the cleaving acid, each must have a concentration of at least about 30% in water, and more preferably, about 50% in water. In general, the particular concentration of hydrogen halide acid suitable for cleavage may be determined by those skilled in the art without undue experimentation.

It is also critical to the present method that the molar ratio of cleaving acid to monotetrahydropyranyl ether salt be at least about 2:1, and more preferably, at least about 5:1. Amounts of acid below 2:1 result in insufficient cleavage of the tetrahydropyranyl group from the polymer chain, further resulting in an undesirably low yield of hydroxy-terminated polycarbonate.

In short, cleavage of the tetrahydropyranyl group is accomplished by simple reaction with the acid at room temperature. However, the particular steps of this technique depend on the particular acid used for cleavage. When a hydrogen halide acid is employed, the organic phase containing the polymer is simply poured into the acid, or vice versa. However, when oxalic acid is used, cleavage is more efficiently accomplished by refluxing the polymer-containing organic phase in a solution of solvents containing a molar excess of oxalic acid. The solvent pair forming this solution is preferably methylene chloride and tetrahydrofuran (THF), but may also be chloroform and THF. Preferred volume ratios for these solvent pairs range from about 40:60 to about 60:40. The cleavage reaction generally requires from about 18 hours to about 24 hours. The presence of hydroxy-terminated polymer may be monitored during reaction with the acid by analytical methods further described below.

After cleavage is deemed to be complete, the carbonate polymer may be steam precipitated, i.e., the reaction solvents are driven from the polymer by high-pressure steam. Alternatively, the polymer may be precipitated in methanol. The polymer product may then be recovered by well-known methods such as filtration, although this step is generally not necessary if steam precipitation is utilized. If desired, the product may then be reacted with a functionalizing agent as described in Ser. No. 939,391.

The monotetrahydropyranyl ether salt containing a tetrahydropyranyl group as described above may be formed by:

(I) catalytically reacting a dihydric phenol like those described above with dihydropyran in the presence of an organic solvent; and then (II) adding alkali metal hydroxide to the combination formed in step (I) to form a composition containing the salt.

The molar ratio of dihydropyran (DHP) to dihydric phenol may range from about 2:1 to about 4:1, with a molar ratio of 2:1 ensuring the highest yield of monotetrahydropyranyl ether salt.

The catalysts which can be used in step (I) are, for example, para-toluenesulfonic acid (PTSA), methanesulfonic acid, hydrochloric acid and acidic ion exchange resins such as Dowex ® 50X2-100 and Amberlite ® IRP-69. Para-toluenesulfonic acid or methanesulfonic acid are the preferred catalysts, with para-toluenesulfonic acid being most preferred. The catalysts may also be used in hydrate form, e.g., para-toluenesulfonic acid monohydrate. The catalyst level may range from about 0.3% by weight to about 0.6% by weight, based on the combined total weight of the dihydric phenol and DHP, with 0.4% by weight generally being the most effective level.

The organic solvent used in step (I) is selected from the group consisting of THF, acetone, and methylethylketone (MEK). Of these solvents, THF is highly preferred for several important reasons. For example, THF is much less hazardous than the organic solvents typically used in this type of process, e.g., diethyl ether. Thus, the monotetrahydropyranyl ether salt can be prepared by the presently-disclosed method on a much larger scale, e.g., greater than 35 lbs./batch, without requiring complex and expensive safety equipment. The amount of solvent required typically comprises from about 75% by weight to about 85% by weight of the combined ingredients of step (I).

The particular technique used to mix the ingredients of step (I) is not critical to the present invention. Typically, a reaction vessel may be charged with the dihydric phenol and a portion of the solvent; the contents are stirred until all solids have dissolved. The catalyst may then be added under agitation, and dihydropyran and the rest of the solvent are then added as a premixture to the dihydric phenol-containing solution. When using this technique and THF as the solvent, it is preferred that the DHP/THF premix be added slowly to the reaction solution. For example, about 30 minutes should be allowed for every 13 lbs. of premix being added. Stirring for about 15 hours to about 20 hours after addition of the premix generally ensures complete reaction between the dihydric phenol and the DHP. The reaction of step (I) may be carried out at ambient temperature, e.g., from about 20° C. to about 28° C.

After step (I) is complete, an alkali metal hydroxide such as those described above is added to form the monotetrahydropyranyl ether salt. The amount of metal hydroxide employed is that amount necessary to stoichiometrically react with all free hydroxy groups remaining on the monotetrahydropyranyl-capped dihydric phenol.

After step (II) is carried out to form a composition containing the monotetrahydropyranyl ether salt, a paraffin solvent containing at least 5 carbon atoms is added to the composition to form a three-phase system. Illustrative paraffin solvents suitable for use herein are n-pentane, n-hexane, n-heptane, and n-octane, as well as isomers thereof, such as cyclohexane and isooctane. Furthermore, petroleum ethers may also be suitable. n-Heptane is the preferred paraffin solvent because of its relatively low flammability and toxicity. The amount of paraffin solvent required depends in part upon the particular monotetrahydropyranyl ether salt present and generally ranges from about 12% by weight to about 16% by weight of the total reaction mixture.

The first phase of the three-phase system consists essentially of a dihydric phenol dicapped with the tetrahydropyranyl group or a salt thereof, the paraffin solvent, and the organic solvent used in step (I) above. Residual amounts of the monotetrahydropyranyl ether salt might also be present in the first phase, typically at levels of less than 5% by weight. The components of the first phase are merely by-products in the formation of the salt. This phase may be separated from the second and third phases by well-known methods such as decantation, centrifugation or filtration.

The second phase consists essentially of the desired product, i.e., the monotetrahydropyranyl ether salt in solid form. This second phase may also contain residual amounts, generally less than about 5% by weight, of the dialkali metal salt of the dihydric phenol, e.g., the disodium salt of bisphenol A when such components are used.

The second phase may be separated from the other two phases by well-known methods, some of which are referred to above, e.g., decantation, centrifugation, and the like.

The third phase consists essentially of alkali metal hydroxide, water, and the bulk of the dialkali metal salt of the dihydric phenol, none of these components being part of the desired product. This phase may be separated by any of the methods described above.

The monotetrahydropyranyl ether salt may be recovered from the second phase in pure form by several methods. For example, the salt may be filtered and then washed with additional paraffin solvent. After again filtering to dryness, the solid salt product may be stirred with an aqueous solution of an alkali metal hydroxide such as sodium hydroxide for about 30 minutes to about 60 minutes. The resulting suspension may then be filtered and washed two additional times with more of the alkali metal hydroxide. The product may then be dried for about 24 hours to about 48 hours at about 55° C. to about 65° C., with higher temperatures compensating for shorter times, and vice versa. Any impurities still present may be removed by regrinding the salt, washing an additional time with the paraffin solvent and then alkali metal hydroxide, and then redrying the washed material. The monotetrahydropyranyl ether salt may then be utilized during the reaction of a dihydric phenol with a carbonyl halide to form a carbonate polymer capped at both ends with the monotetrahydropyranyl ether salt groups, which are subsequently removed to form the hydroxy-terminated polymer, as described above.

The presently disclosed method permits preparation of the salt on a large scale, i.e., greater than 35 pounds per batch, while making unnecessary the use of diethyl ether, a solvent which is extremely hazardous in the work place. Furthermore, the monotetrahydropyranyl ether salt prepared by this process exhibits the same desirable properties as those salts prepared by prior art methods, e.g., high purity, solubility, off-white color, and a particle size large enough to permit centrifugation.

EXAMPLES

The following examples are provided to more fully describe the present invention. It is intended that these examples be considered as illustrative of the invention, rather than limiting what is otherwise disclosed and claimed herein.

EXAMPLE 1

This example demonstrates the preparation of a hydroxy-terminated polycarbonate polymer according to the present invention.

A 500 ml. Morton flask equipped with a mechanical stirrer, water-cooled condenser, pH probe and subsurface gas inlet tube was charged with water (55 ml.), methylene chloride (65 ml.), triethylamine (2.5 ml. of a 5% solution, 1.0 mole %), bisphenol A (29.2 grams, 0.128 mole) and a monotetrahydropyranyl ether sodium salt (2.0 grams, 4.7 mole %). After about 2 minutes, gaseous phosgene was introduced into the agitated charge for 20 minutes at a rate of 0.08 gram per minute while maintaining the pH at 10.0-11.0. The phase containing methylene chloride, i.e., the organic phase, was separated, washed with 1M HCl and then stirred with 30 ml. of concentrated HCl for 15 minutes. The ratio of HCl to the monotetrahydropyranyl ether salt was 5:1. The organic phase was water-washed five times and then antisolvent-precipitated with methanol. The polymer product was dried in a vacuum oven at 100° C. for about 15 hours. The weight average molecular weight of the product as measured by gel permeation chromatography (GPC) was 52,060. Fourier Transform analysis (FT-IR) showed a hydroxyl stretch at 3582 cm$^{-1}$. Furthermore, a high field proton NMR spectrum showed that no THP signal remained, indicating that the tetrahydropyranyl group had been completely removed.

EXAMPLE 2

A carbonate polymer chain-terminated with the monotetrahydropyranyl ether salt by the process described in Example 1 was dissolved to 10% by volume in a 1:1 solution of CH$_2$Cl$_2$/THF containing a molar excess of oxalic acid. The molar ratio of oxalic acid to the salt was about 183:1. After the solution was heated at 50° C. for about 15 hours, the hydroxy-terminated product was precipitated into methanol.

The molecular weight of the product, as determined by GPC analysis was 54,500. FT-IR analysis showed a hydroxyl stretch at 3582 cm$^{-1}$.

EXAMPLE 3

Samples 1-3 were hydroxy-terminated carbonate polymers formed using the materials and method of Example 1. The molar percentage of monotetrahydropyranyl ether salt was varied for each sample as indicated in Table 1:

TABLE 1

| Sample No. | Mole % of monocapped salt[a] | Molecular weight (wgt. avg.)[b] |
| --- | --- | --- |
| 1 | 3.5 | 64,720 |
| 2 | 4.0 | 55,670 |
| 3 | 4.7 | 52,060 |

[a]Percentage based on moles of bisphenol A.
[b]Molecular weight was calibrated versus a polystyrene standard.

Table 1 demonstrates that the molecular weight of the hydroxy-terminated carbonate polymer may be accurately controlled by adjusting the amount of chain-terminator (i.e., the salt) present.

EXAMPLE 4

This example was outside the scope of this invention and demonstrates the criticality of using hydrochloric acid at a concentration of at least about 15% in water.

5.0 grams of the chain-terminated carbonate polymer prepared according to the procedure of Example 1 was dissolved in 30 ml. of THF and 30 ml. of $CH_2Cl_2$. 10.0 ml. of 10% HCl and 10.0 ml. of $H_2O$ were added to the solution. The solution was stirred for about 24 hours.

The organic phase was then washed with water and antisolvent-precipitated with methanol as in Example 1. The polymer product was then dried in a vacuum oven at 100° C. for about 15 hours.

Analysis by High Field Proton NMR indicated that cleavage of the tetrahydropyranyl group had not occurred, thereby demonstrating the necessity of maintaining a higher hydrochloric acid concentration.

EXAMPLE 5

This example demonstrates preparation of a monotetrahydropyranyl ether salt according to the process of the present invention. A 1.0 liter flask was charged with 57 g. (0.25 mole) of bisphenol A and 300 ml. of THF. The contents were stirred until all solids had dissolved. 0.3 g. of para-toluenesulfonic acid monohydrate was added to the solution. 24 ml. (0.25 mole) of dihydropyran and 50 ml. of THF were combined in an addition funnel and then added slowly over 30 minutes to the solution. Stirring at room temperature was continued for another 2 hours.

About 100–150 ml. of a 25% sodium hydroxide solution was slowly added under rapid agitation to form the monotetrahydropyranyl ether salt. About 200–300 ml. of heptane was added to make stirring and pouring easier. The salt was then filtered through a fritted glass funnel and subsequently washed with another 100 ml. of heptane. After being filtered to dryness, the solid filter cake was broken up and mixed with 5% sodium hydroxide (500 ml.) for about 30–60 minutes. The resulting suspension was filtered and then washed two additional times with 5% sodium hydroxide. The solid product was dried in a vacuum oven for about 48–64 hours at 60° C.

The monotetrahydropyranyl ether salt product melted at 140° C. and sublimed at 143° C. The purity of the product was checked by means of proton NMR, high pressure liquid chromatography (THF/water solvent system), and by thin-layer chromatography (methylene chloride/acetic acid). By each method, purity was determined to be at least 95%. Furthermore, a 60% yield was obtained, based on moles of bisphenol A used. This yield was judged to be very high in view of the fact that the salt-forming reaction is equilibrium-controlled.

Modifications and variations of the present invention are possible in light of the above teachings. It should therefore be understood that changes may be made in the particular embodiments of the invention described which are within the full intended scope of the invention as defined by the appended claims.

What is claimed is:

1. A method of preparing a hydroxy-terminated thermoplastic polymer having recurring carbonate units in the main chain, comprising:

(a) reacting a dihydric phenol with a carbonyl halide in the presence of an alkali metal salt of a monotetrahydropyranyl ether of a dihydric phenol, having the formula

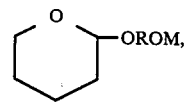

wherein R is a divalent aromatic compound containing from about 6 to about 30 aromatic carbon atoms and M is an alkali metal ion, said salt being present in an amount effective to control the molecular weight of the resulting polymer; and (b) removing the tetrahydropyranyl group from the polymer with an effective amount of an acid.

2. The method of claim 1 wherein the acid is oxalic acid or hydrochloric acid.

3. The method of claim 1 wherein the molar ratio of the acid to the monotetrahydropyranyl ether salt is at least about 2:1.

4. The method of claim 3 wherein the molar ratio of the acid to the monotetrahydropyranyl ether salt is at least about 5:1.

5. The method of claim 3 wherein the acid is in the form of an aqueous solution containing at least about 15% by weight hydrogen chloride.

6. The method of claim 5 wherein the aqueous solution contains at least about 37% by weight hydrogen chloride.

7. The method of claim 1 wherein R has the formula

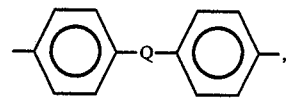

Q being selected from the group consisting of oxygen, sulfur, dialkyl or diaryl silicon, fluorenyl, cyclohexyl, and alkylene groups containing from about 1 to about 5 carbon atoms.

8. The method of claim 7 wherein M is sodium and R is a bisphenol A radical.

9. The method of claim 1 wherein the thermoplastic polymer is prepared by interfacial polymerization.

10. The method of claim 9 wherein a mixture of the dihydric phenol in aqueous sodium hydroxide is dispersed in a mixture comprising an organic solvent, the monotetrahydropyranyl ether salt, and a tertiary amine or quaternary ammonium base to form a two-phase composition prior to addition of the carbonyl halide.

11. The method of claim 10 wherein the dihydric phenol is bisphenol A, the organic solvent is methylene chloride, and the tertiary amine is triethylamine.

12. The method of claim 10 wherein the two-phase composition comprises, after addition of the carbonyl halide, an organic phase containing the organic solvent, free amine, and the chain-terminated polymer; and an aqueous phase containing a metal salt, reaction by-products, and a metal hydroxide.

13. The method of claim 12 wherein the organic phase is separated from the aqueous phase and subsequently reacted with the acid.

14. The method of claim 13 wherein the dihydric phenol is bisphenol A, the organic solvent is methylene chloride, and the tertiary amine is triethylamine.

* * * * *